US007316863B2

(12) United States Patent
Sato (10) Patent No.: US 7,316,863 B2
(45) Date of Patent: Jan. 8, 2008

(54) BATTERY PACK HAVING THIN TERMINAL BOARD

(75) Inventor: Bunya Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 10/817,299

(22) Filed: Apr. 2, 2004

(65) Prior Publication Data

US 2004/0197642 A1    Oct. 7, 2004

(30) Foreign Application Priority Data

Apr. 4, 2003    (JP) .......................... P2003-101822

(51) Int. Cl.
*H01M 2/24*    (2006.01)
(52) U.S. Cl. ........................ 429/158; 429/159; 429/160
(58) Field of Classification Search ................ 429/158, 429/159
See application file for complete search history.

(56) References Cited

U.S. PATENT DOCUMENTS 4,581,306 A * 4/1986 Hasenauer et al. ......... 429/123
5,948,559 A * 9/1999 Snyder ....................... 429/121
6,296,970 B1 * 10/2001 Killebrew et al. .......... 429/158

FOREIGN PATENT DOCUMENTS

GB              2206726 A    *  1/1989
JP          2000-036299        *  2/2000

* cited by examiner

*Primary Examiner*—Jonathan Crepeau
*Assistant Examiner*—Tony Chuo
(74) *Attorney, Agent, or Firm*—Sonnenschein Nath & Rosenthal LLP (57) ABSTRACT

A battery pack housing a plurality of battery cells in a case and respectively connecting the positive electrodes and the negative electrodes of the plurality of battery cells to conductive terminal boards to be led out to outside terminals is provided. The conductive terminal board has a structure in which a first member is joined with a second member such that the first member having excellent weldability is arrayed in a plurality-of-islands state in the second member having excellent conductivity, and the positive electrodes and the negative electrodes of the battery cell are welded to the first member of the conductive terminal board through resistance-welding, so that the battery pack capable of efficiently supplying a large amount of current is provided.

4 Claims, 7 Drawing Sheets

BATTERY PACK HAVING THIN TERMINAL BOARD

BACKGROUND OF THE INVENTION

1. Field of the Invention

The present invention relates to a battery pack that houses a plurality of chargeable battery cells in a case and is used as the power source of portable equipment such as a video-camera, a portable personal computer, a digital camera, a mobile phone, PDA or the like.

2. Description of the Related Art

Figure 1:
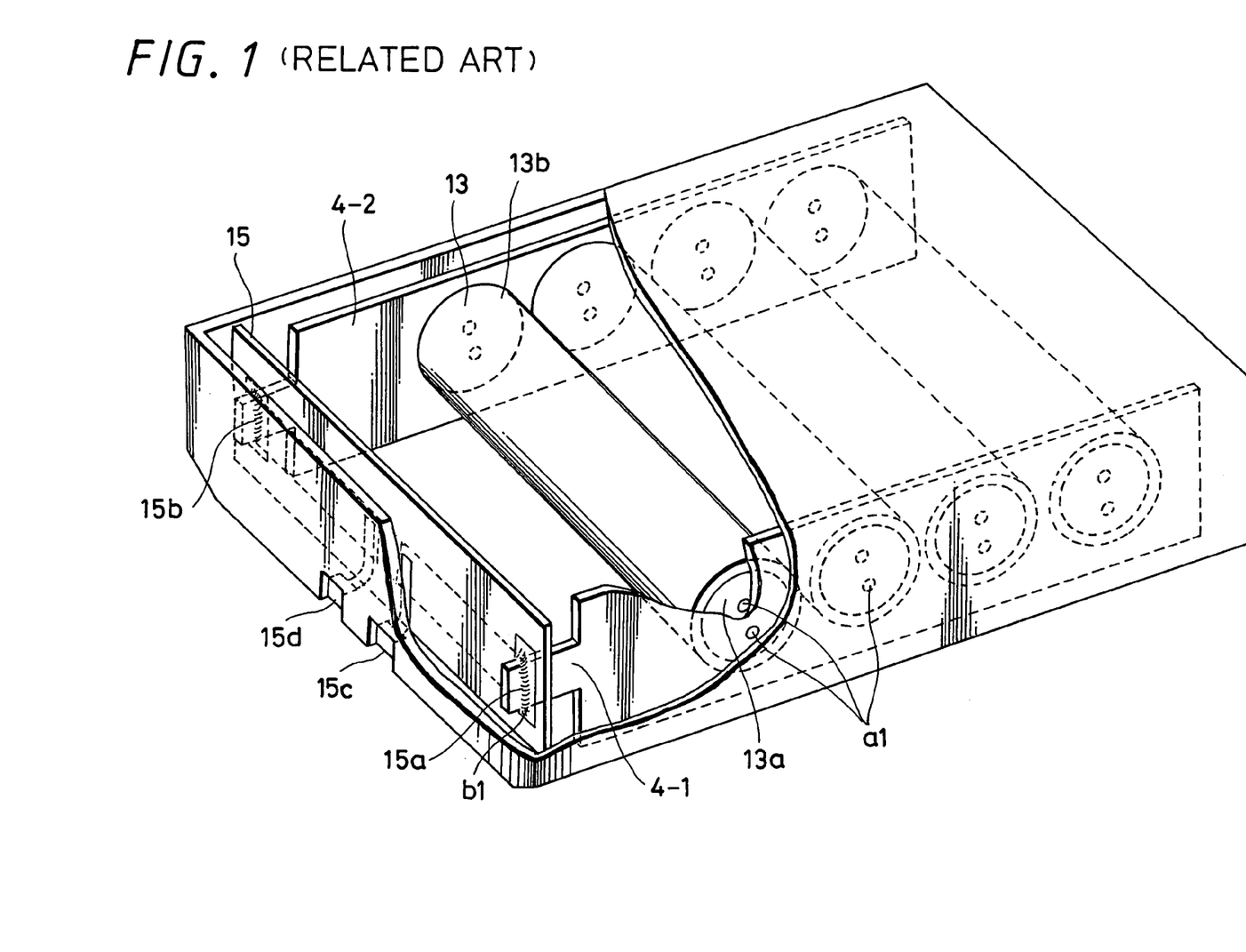
FIG. 1 is a perspective view, a part of which is cross-sectional, for explaining the shape of a conventional battery pack.

A conventional battery pack capable of charging is shown in FIG. 1. An example of the battery pack will be explained with reference to FIG. 1.

In FIG. 1, the battery pack is an approximately rectangular case made of insulative material such as plastic or the like, that houses a plurality of battery cells 13 composed of chargeable secondary battery cells such as, for example, a cylindrical nickel cadmium cell or nickel hydrogen battery, lithium ion battery, lithium metal battery or the like. Then, a positive electrode 13a and a negative electrode 13b of the battery cell 13 are respectively connected by resistance-welding to terminal boards 4-1, 4-2 made of a mono-metal plate of nickel or the like that has a favorable welding property. In addition, a protective circuit is incorporated therein for protecting the battery cell 13 and is led to outside terminals 15c, 15d of the positive and negative electrode in case a charging voltage becomes excessive.

Conventionally, the thickness of the metal plate of the positive and negative electrodes of the battery cell is about 0.10 mm to 0.2 mm or so. Additionally, as the material of the conductive terminal boards 4-1, 4-2 that are connected to the battery cells 13, nickel (Ni) is, for example, used that excels in terms of a resistance-welding property compared with copper (Cu) and aluminum (Al) that are conventionally used as wiring materials, and since fluctuations in welding strength occur when the thickness thereof is made thicker than 0.2 mm resulting in deterioration in connection reliability, a metal plate of about 0.15 mm or so in thickness is used.

Assuming that the thickness of each of the metal plates of the positive electrode and negative electrode of the battery cell is about 0.3 mm or so, connection reliability becomes higher even when the thickness of the material of the conductive terminal boards 4-1, 4-2 connected to the battery cells 13 is about 0.2 mm to 0.25 mm or so.

In this manner, the maximum value of the thickness of the material of the conductive terminal boards 4-1, 4-2 connected to the battery cells 13 depends on the thickness of the metal plates of the positive and negative electrodes of the battery cells 13.

Here, conventionally it is difficult to make the thickness of the metal plates of the positive and negative electrodes of the battery cells equal to or thicker than 0.25 mm when manufacturing costs, outer dimensions, and discharge capacity are taken into consideration.

For example, when the thickness of the metal plates of the positive and negative electrodes of the battery cell is made thicker, manufacturing costs become higher and discharge capacity deteriorates. This is attributed to the fact that there occurs a decrease in the cubic volume of electrode material that contributes to discharge capacity within the battery cell by the amount of an increase in the cubic volume of the metal plates of the positive and negative electrodes thereof.

As described above, since the conductive terminal plates 4-1, 4-2 are each connected by resistance-welding to the battery cells 13, that is, individual batteries in the battery pack, nickel is conventionally used as the material of the conductive terminal boards 4-1, 4-2. In addition, when this nickel is used, however, it is difficult to make the thickness thereof thicker than 0.15 mm in light of the above-mentioned connection reliability and further, since the thickness and width thereof are restricted due to limitations on housing space in a battery case, there is a limit for the conductive terminal boards 4-1, 4-2 consisting of the mono-metal of nickel to make wiring resistance smaller. Particularly, considering a growing demand of supplying a large amount of electricity of late, loss of energy due to electric resistance that the conductive terminal boards possess themselves becomes not negligible, which results in an inconvenience that can not be coped well with.

Therefore, as for the conductive terminal boards 4-1, 4-2 of the battery, propositions have been made as to what are described in patent documents 1 and 2. In the patent document 1 there is a description with respect to terminal wiring boards of a battery that are welded to the electrode terminal portions of individual batteries used in order to secure electric connections to the individual batteries constituting a set of batteries. The terminal wiring board includes a welding portion that has a mono-material structure of nickel and a conductive portion that has a multi-material laminated structure of nickel and copper or aluminum.

On the other hand, in the patent document 2, there is a description concerning wiring materials suitably used in a battery pack, a method of manufacturing thereof, and the like. The wiring materials are constituted such that conductive materials capable of metal welding such as iron (Fe), iron alloy, nickel (Ni), nickel alloy and the like are integrally joined in parallel with a plurality of heterogeneous highly conductive materials composed of conductive materials such as copper, copper alloy, and the like. As for the manufacturing method, a plurality of heterogeneous conductive materials composed of the above-mentioned materials are integrally joined such that after they are welded in parallel by means of electronic beam welding and then subjected to metal rolling in order to obtain a required thickness, annealing treatment is added thereto.

[Patent Document 1]

Japanese Laid-open Patent Application No. 2000-36299

(The second page, FIGS. 1a, b, and c)

[Patent Document 2]

Japanese Laid-open Patent Application No. 2000-229741

(The second page, FIG. 1)

However, with respect to the above-mentioned conductive terminal boards used in conventional battery packs, particularly regarding the one described in the Patent document 1, there occur such inconveniences that the thickness thereof becomes thicker as a whole because of a metal laminated structure and its resistance value becomes comparatively higher. In addition, in the one described in Patent document 2 there is also an inconvenience that the processes of manufacturing the conductive terminal board becomes complicated and difficult to be performed.

SUMMARY OF THE INVENTION

In view of such problems, it is an object of the present invention to obtain a battery pack using a conductive terminal board in which low resistance is realized along with securing the high connection reliability on resistance welding with battery cells, so that the loss of energy is decreased, the thickness of board is made thinner, and manufacturing thereof becomes easy.

A battery pack according to the present invention is the battery pack that houses in a case a plurality of battery cells, the positive electrodes and negative electrodes of which are respectively connected to conductive terminal boards through resistance welding to be led out to the outside terminals of the positive and negative electrodes, wherein the conductive terminal board is constituted such that a first member with excellent weldability is joined with a second member with excellent conductivity so that a the first member is arrayed in a plurality-of-islands state in the second member and the positive electrodes and negative electrodes of the battery cells are resistance-welded to the above first member of the conductive terminal board.

Since the conductive terminal board used in the battery pack according to the present invention is constituted such that the first member with excellent weldability is joined with the second member with excellent conductivity so that the first member is arrayed in a plurality-of-islands state in the second member, the thickness of the terminal board is made thinner as they are joined with each other. In addition, since approximately the whole of the conductive terminal board consists of the second member with excellent conductivity, a low resistance property is obtained, and also, since the connection to the battery cell is conducted using the first member with an excellent resistance-welding property, the terminal board with a low resistance property and an excellent welding property can be obtained. Accordingly, the battery pack having the conductive terminal board with both the excellent conductive property and welding property is obtained, in which the loss of energy is reduced, a large amount of electric current can be applicable, and manufacturing is easy because of a simplified wiring structure.

BRIEF DESCRIPTION OF THE DRAWINGS

FIGS. 3A to 3D are perspective views for explaining an embodiment of the present invention.

FIGS. 6A to 6D are perspective views for explaining another example of the shapes of a first member and second member constituting conductive terminal board according to an embodiment of the present invention.

FIGS. 8A and 8B are perspective views for explaining another example of the shapes of a first member and second member constituting a conductive terminal board and a method for joining the first and second members according to an embodiment of the present invention; FIGS. 9A and 9B are perspective views for explaining another embodiment of the present invention.

DESCRIPTION OF THE PREFERRED EMBODIMENTS

Hereinafter, an embodiment of a battery pack according to the present invention will be explained with reference to the drawings.

Figure 2:
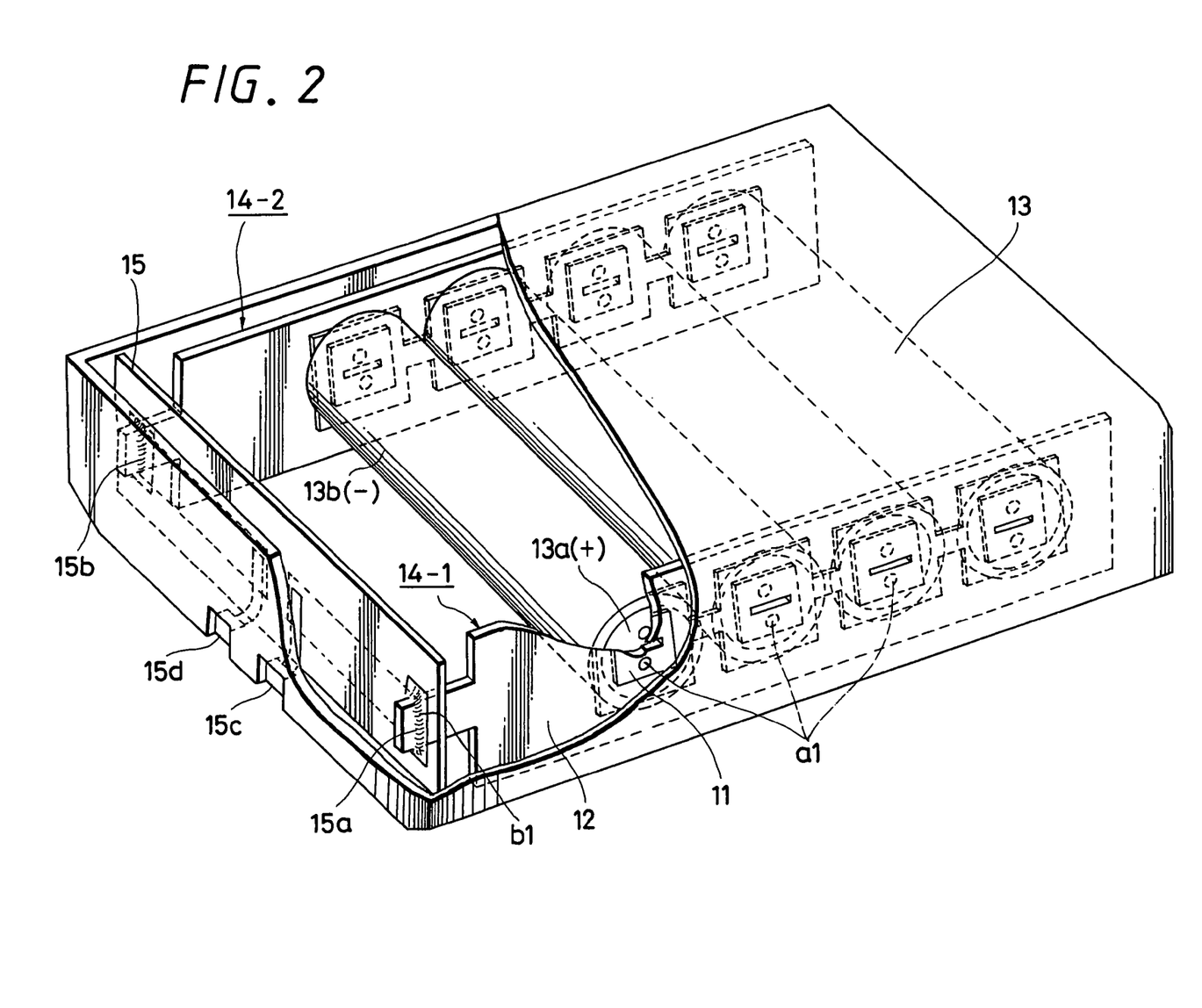
FIG. 2 is a perspective view, a part of which is cross-sectional, for explaining an embodiment of a battery pack of the present invention.

The embodiment of the present invention will be explained by referring to FIGS. 2 to 4. In FIG. 2, the battery pack houses, in an approximately rectangular case made of insulative material such as plastic or the like, four battery cells 13 composed of a rechargeable, for example, cylindrical secondary battery such as a nickel cadmium cell, a nickel hydrogen battery, a lithium ion battery, a lithium metal battery, or the like. Further, a positive electrode 13a and a negative electrode 13b of the battery cell 13 are connected to insulative terminal boards 14-1, 14-2, respectively.

Further, projecting portions at one end of the insulative terminal boards 14-1, 14-2 are each inserted and attached to copper foil lands 15a, 15b each having a slit formed in a control circuit substrate 15 and then connected by soldering or the like before being housed in the above case, with the positive electrode and negative electrode of the control circuit substrate 15 led to the outside of the case as outside terminals 15c, 15d. In addition, the control circuit substrate 15 is a print wiring substrate incorporated with, other than the copper foil lands 15a, 15b each having a slit, a protective circuit not shown in the figure, for protecting the battery cells 13 in case a charging voltage becomes excessive.

In this embodiment, there is shown the battery pack composed of two conductive terminal boards 14-1, 14-2, four battery cells 13 and the like, and the positive electrodes 13a of the battery cells 13 are connected at four points in parallel to the conductive terminal board 14-1 and the negative electrodes 13b thereof are connected at four points in parallel to the conductive terminal board 14-2. The battery cell 13 has a structure in which battery materials are contained in a cylindrical container with a bottom constituting the negative electrode 13b made of iron or the like of approximately 0.2 mm in thickness, with an opening portion at one end thereof being plugged up with a lid constituting the positive electrode 13a made of nickel (Ni) or the like and caulked through insulative packing. The conductive terminal boards 14-1, 14-2 respectively connected to the positive electrode 13a and negative electrode 13b of the battery cell 13 each have a predetermined region in a resistance welding portion formed of a first member 11 made of conductive material with excellent weldability and the other region formed of a second member 12 made of conductive material with excellent conductivity.

Figure 3A:
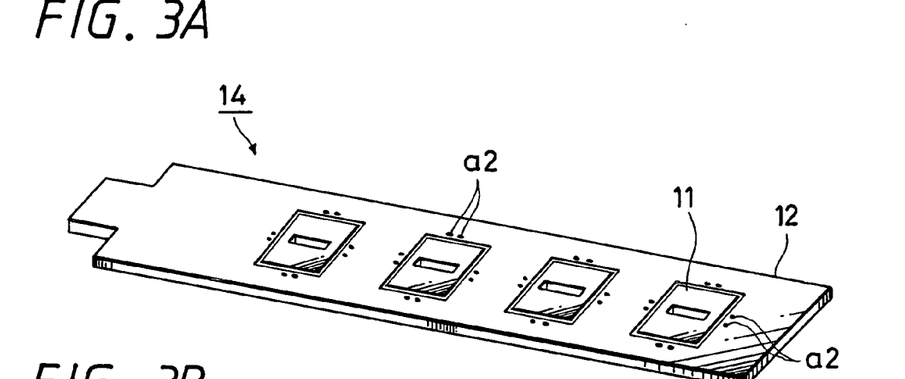
FIG. 3A is a perspective view of a conductive terminal board after members are joined.
Figures 3B, 3C:
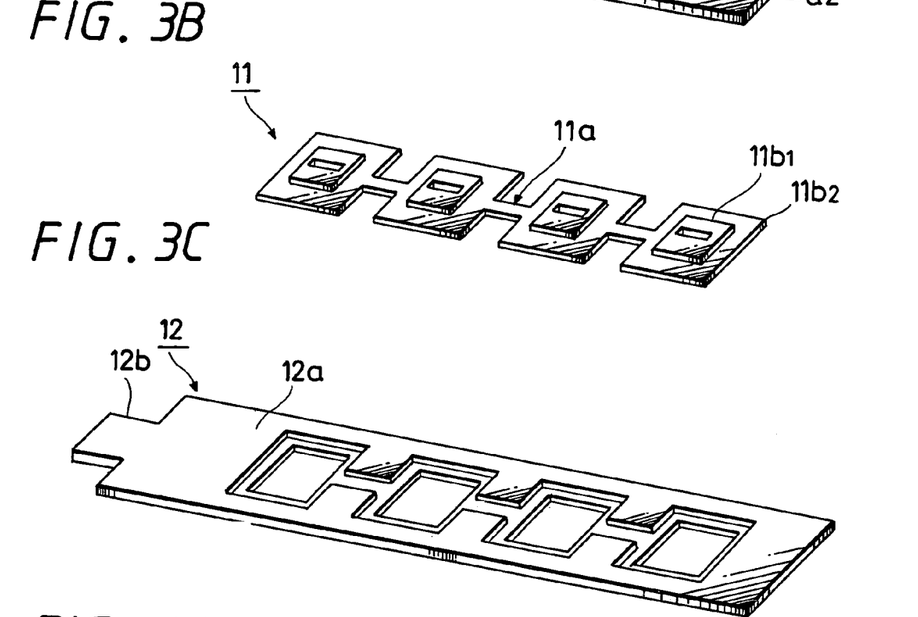
FIG. 3B is a perspective view showing an outer appearance of a first member.
FIG. 3C is a perspective view showing an outer appearance of a second member.
Figure 3D:
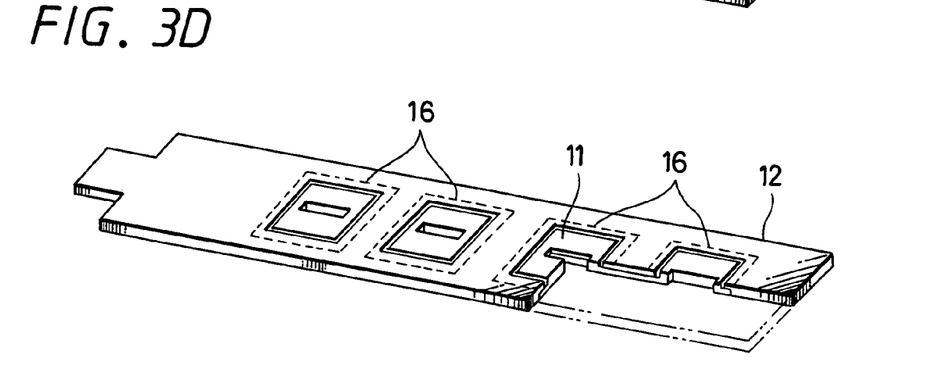
FIG. 3D is a perspective view, a part of which is cross-sectional, showing a state of the first member combined with the second member.

FIGS. 3A to 3D are diagrams for explaining the conductive terminal boards 14 (14-1, 14-2) of the battery pack shown in FIG. 2. FIG. 3A shows the conductive terminal board 14 used in FIG. 2, in which the first member 11 is integrally joined with the second member 12. The figure shows a state in which the first member 11 with rectangular slits is arrayed and joined with the second member 12 as constituting island portions, with their upper surfaces exposed in an islands-like state. Here, the first member 11 is formed of a metal with excellent weldability such as, for example, nickel (Ni), and the second member 12 is formed of a metal with better conductivity than the first member 11 such as, for example, copper (Cu) having a shape to engage with the first member.

As shown in FIG. 3B, the first member 11 with excellent weldability has a structure in which four blocks of approximately 0.15 mm in thickness with two kinds of large and small quadrangles superimposed (blocks of a small upper block portion 11b1 and a large base block portion 11b2 integrally superimposed with approximately matching both the center thereof) are made, arrayed at approximately equal intervals, and the block base portions 11b2 are connected using bridge portions 11a to become an interconnected shape that is easy to be handled. In addition, in the center portion of the block portion of the first member 11 there is provided a rectangular slit of some width that two welding electrodes of the welding machine can straddle in order to improve weldability and quality when the battery cell 13 is electric resistance welding to the first member.

On the other hand, as shown in FIG. 3C, the second member 12 with excellent conductivity has a structure in which a projecting portion 12b for connecting a control circuit substrate 15 is provided on one short side of a plate portion 12a of approximately 0.15 mm in thickness having an oblong card shape larger than the first member 11 in outer shape thereof. Then, when the first member 11 is combined with the plate portion 12a of the second member 12, there is provided the shape that the combined thickness becomes approximately uniform. Accordingly, the conductive terminal board 14 is constructed such that the first member 11 and the second member 12 are combined and then integrally joined as shown in FIG. 3D.

Those first member 11 and second member 12 are each manufactured in the following way, for example. That is, the first member 11 is formed into a required shape by forming in advance a stepped difference by etching or the like, providing rectangular slits by punch out pressing or the like, and separating to form an outer shape by the use of such methods as punch-out pressing and additional etching. On the other hand, the second member 12 is formed into a required shape by forming a stepped difference by the use of such methods as etching and mold pressing, forming holes by the use of such methods as punch-out pressing and the like, and finally punching out the whole by punch-out pressing or the like. Then, the conductive terminal board 14 is obtained by combining the first member 11 with the second member 12, as shown in FIG. 3D. Then, an overlapped portion 16 forming a rectangular frame region, that is, a stepped difference portion of the periphery of the first member 11 where the first member 11 and second member 12 engage with each other is joined at a plurality of points by series spot welding or the like of the known electricity-resistance-welding.

Figure 4:
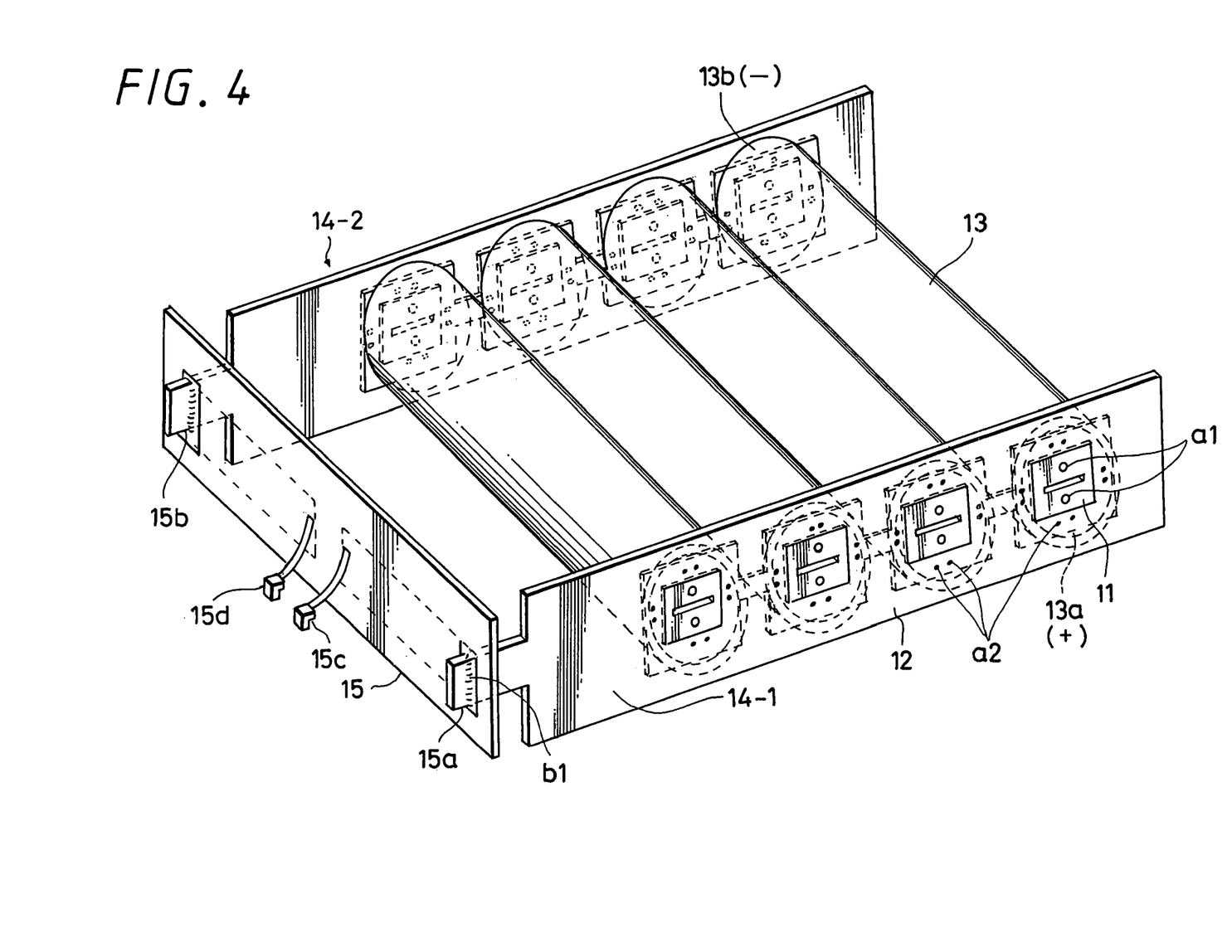
FIG. 4 is a perspective view showing an embodiment of the present invention in which respective parts are connected to each other using the conductive terminal boards of the present invention.

As shown in FIG. 4, the conductive terminal board 14 obtained as described above is combined with the battery cells 13 and the above-mentioned control circuit substrate 15 to be connected and housed in the case to be the battery pack. As for two sheets of the conductive terminal boards 14 (14-1, 14-2) manufactured for the positive electrode 13a side and the negative electrode 13b side of the battery cells 13, island portions at four points of the first member 11 of the one sheet of conductive terminal board 14-2 and the negative electrodes 13b of the four battery cells 13 are combined by the known series spot welding. Then, four island portions of the first member 11 of the other conductive terminal board 14-1 and the positive electrodes 13a of the four battery cells are welded by series spot welding.

Next, the projecting portion 12b of the conductive terminal board 14-2 connected to the negative electrodes 13b of the battery cells 13 is inserted into the slit of the copper foil land 15b on the negative side of the control circuit substrate 15 and then soldered. Finally, the projecting portion 12b of the conductive terminal board 14-1 connected to the positive electrodes 13a of the battery cells 13 is inserted into the slit of the copper foil land 15a on the positive side of the control circuit substrate 15 and then soldered. Consequently, the battery cells 13, the control circuit substrate 15, and the conductive terminal boards 14 are electrically connected to be housed in a case and sealed to be the battery pack, and then attached to a battery charger not shown in the figure, charged with a predetermined voltage and put to use after the completion of charging.

As explained so far, the conductive terminal board 14 of the present invention has a structure in which a plate of approximately 0.15 mm in thickness made of such as nickel (Ni) or the like, that is the first member 11 with excellent weldability, is embedded in positions, for welding to the battery cells 13, of a base material that is a thin plate of approximately 0.15 mm in thickness made of such as copper (Cu) or the like, that is the second member 12 with excellent conductivity to be then integrally joined.

Accordingly, since both the members 11, 12 are integrally joined, the thickness of the conductive terminal board 14 can be made as thin as approximately 0.15 mm. As a result, when the battery cells 13 are connected to the conductive terminal boards 14, since electricity-resistance-welding is possible between the battery cells and the first members 11 with excellent resistance-welding property, secure connections can be realized, and the connection reliability becomes excellent. Additionally, since most of the conductive terminal board 14 except for the portions to be welded with the battery cells 13 is composed of copper of approximately 0.15 mm in thickness, that is, the second member having excellent conductivity, low volume resistivity, and excellent thermal conductance, wiring resistance becomes smaller and heat dissipation becomes larger.

Consequently, when the above conductive terminal board 14 is used as constituting parts of the battery pack, energy loss is improved and a large amount of electric current can be applicable because the temperature of the battery cells themselves can be prevented from rising. Further, since the conductive terminal board 14 has elasticity, it can be flexibly housed even if the battery pack has minimum space therein.

Additionally, since both the first member 11 and second member 12 can be formed by the use of simple manufacturing methods such as an etching method, mold pressing and punch-out pressing, and joining of the first member with second member can be practiced by electricity-resistance-welding, it becomes easy to manufacture the conductive terminal board 14.

Further, since the first member 11 in this embodiment is provided with rectangular slits in regions for resistance-welding to electrodes of the battery cells 13 such that the electrodes for series spot welding of the electricity-resistance-welding can straddle when the first member is connected to the battery cells 13, the amount of an ineffective shunt current which is an electric current of the welding current that does not contributes to welding, becomes less as they are blocked by the rectangular slits, making it possible for the most of the electric current to contribute to the resistance welding. Specifically, since the first member 11 is provided with rectangular slits in regions for resistance welding so that the welding electrodes are to straddle, the electric current that contributes to the welding can be relatively increased when compared with the case where there are no rectangular slits, which leads to further improvement of weldability and quality.

Another example of a conductive terminal board used in the present invention will be explained with reference to FIGS. 5 to 8. In explaining FIGS. 5 to 7 in the following, portions corresponding to those in FIG. 3 will be given the same symbols and detailed explanations thereof will be omitted.

Figure 5:
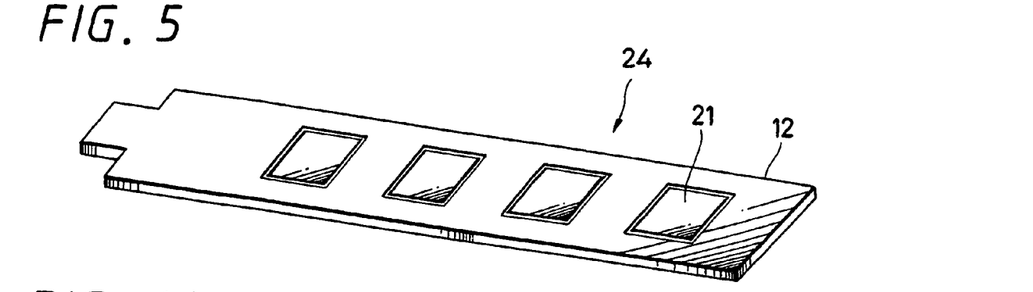
FIG. 5 is a perspective view for explaining another example of the shape of a first member constituting a conductive terminal board according to an embodiment of the present invention.

FIG. 5 shows another example of the shape of a first member constituting the conductive terminal board used in the present invention. A first member 21 in this figure is different from the example of FIG. 3, in which rectangular slits are not provided therein while a second member 12 is the same as that used in the above embodiment of the present invention. Then, a conductive terminal board 24 is formed by the use of the same joining method as in the example of FIG. 3. In this case, since the rectangular slits are not provided in the first member 21, the number of processes in manufacturing the member can be reduced and therefore, the costs of the first member become low with respect to constituting parts.

Using the two conductive terminal boards 24 constituted as described above, four battery cells 13, and one sheet of the control circuit substrate 15; connecting them together; and housing them in a case in the same manner as in the example of FIG. 3, a battery pack can be made. Since the rectangular slits are not provided in the first member 21, welding dispersion shall be a little larger compared with the case where rectangular slits are provided in the first member when the conductive terminal board 24 is connected to the battery cells 13; however, by paying attention to controlling the aspect and shape at the tip of the welding electrode, pressure force, and the electric current for welding, it is possible to secure a sufficiently favorable welding quality.

As described above, it can be easily understood that effectiveness similar to the above-mentioned example will be obtained on operation when the conductive terminal board 24 in the example of FIG. 5 is used.

Figures 6A, 6B, 6C, 6D:
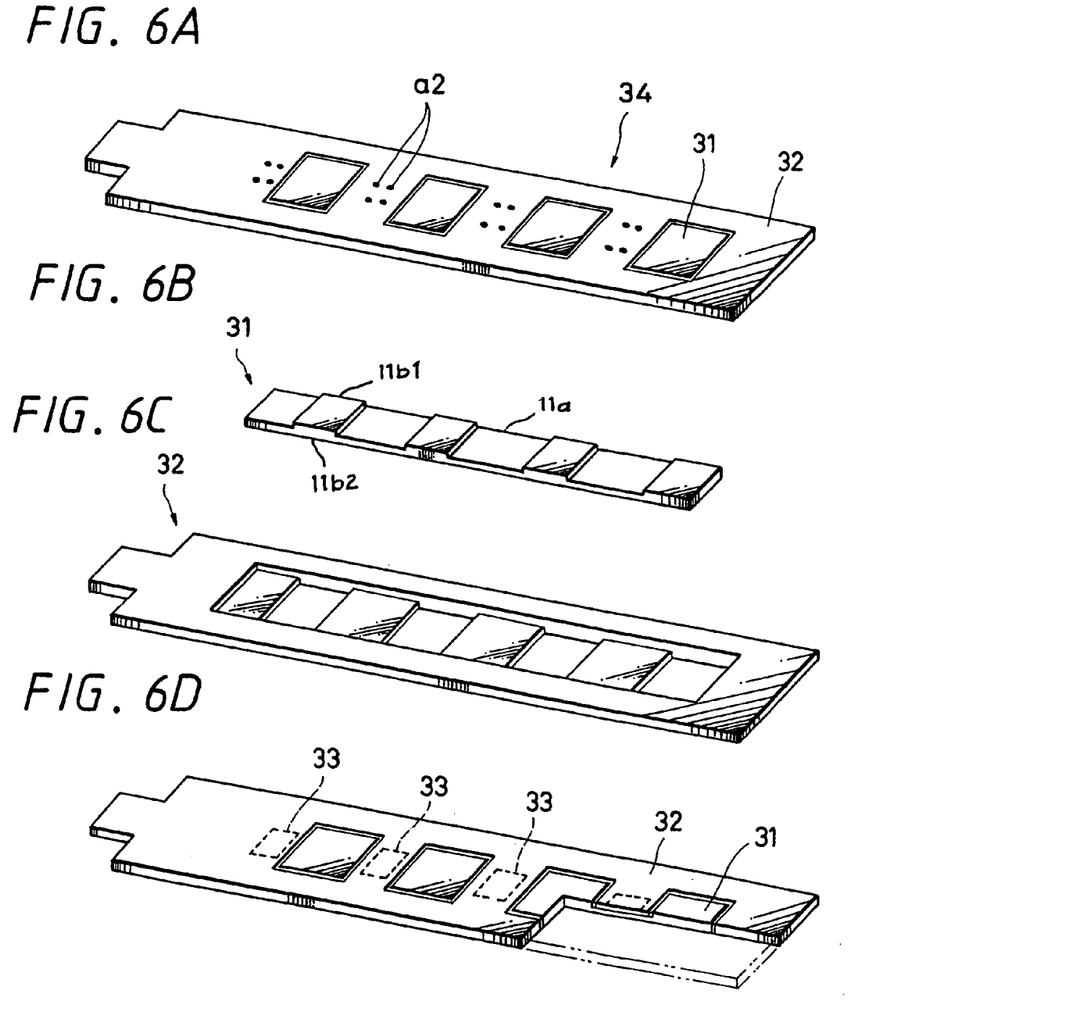
FIG. 6A is a perspective view of the conductive terminal board after the members are joined.
FIG. 6B is a perspective view showing an outer appearance of the first member.
FIG. 6C is a perspective view showing an outer appearance of the second member.
FIG. 6D is a perspective view, a part of which is cross-sectional, showing a state of the first member combined with second member.

FIGS. 6A to 6D show another example of the shapes of a first member and second member constituting a conductive terminal board used in the present invention. The example of this figure is different from the example of FIG. 3, in which rectangular slits are not provided in a first member 31, and joining of a second member with the first member is conducted in regions that are not the periphery of the first member 31. FIG. 6A shows a conductive terminal board 34 in which the first member 31 is joined with the second member 32.

As shown in FIG. 6B, the first member 31 of this example has a shape in which the upper block portion 11$b$1 is equally square-shaped the same as that of the block base portion 11$b$2, the width of the bridge portion 11$a$ is the same as that of the block base portion 11$b$2, and rectangular slits are not provided. On the other hand, the second member 32 is, as shown in FIG. 6C, formed into such a shape as to engage with the first member 31. Those first member 31 and second member 32 are formed by means of the above-mentioned methods and, as shown in FIG. 6D, joined with each other after they are placed one on top of the other.

The conductive terminal board 34 of this example is integrally joined together in the following way. First, the second member 32 is placed upon the first member 31 to be set in a combined state, as shown in FIG. 6D. Next, in the above combined state, both the members 31, 32 are joined to each other at joining regions 33 where the second member 32 and the first member 31 are superimposed by the use of the known series-spot method of electricity-resistance-welding.

Using the two conductive terminal boards 34 constituted in this way, four battery cells 13, and one sheet of the control circuit substrate 15; connecting them together; and housing them in a case in the same manner as in the example of FIG. 3, a battery pack can be made.

According to this example, since joining of the first member with the second member can be conducted at comparatively wide joining regions 33, it becomes easy to manufacture the conductive terminal board 34. In addition, since the rectangular slits are not provided in the first member 31, welding dispersion shall be a little larger compared with the case where rectangular slits are provided in the first member, when the conductive terminal board 34 is connected to the battery cells 13; however, by paying further attention to controlling the aspect and shape at the tip of the welding electrodes, pressure force, and the electric current for welding, it is possible to secure a sufficiently favorable welding quality.

As described above, it can be easily understood that effectiveness similar to the above-mentioned example will also be obtained on operation when the conductive terminal board 34 in this example is used.

Figure 7:
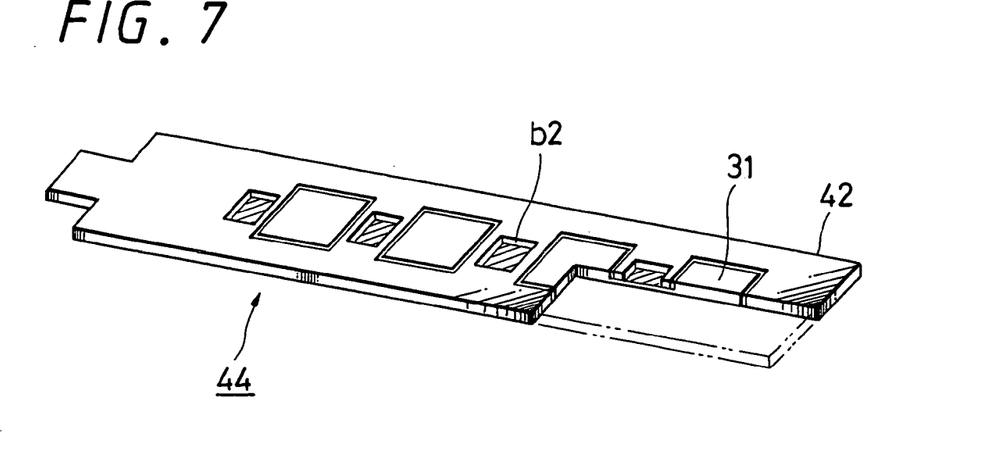
FIG. 7 is a perspective view for explaining another example of the shapes of a first member and second member constituting a conductive terminal board and a method for joining the first and second members according to an embodiment of the present invention.

FIG. 7 shows another example of the shapes of a first member and a second member constituting a conductive terminal board used in the present invention and a joining method thereof. A conductive terminal board 44 of this example consists of the first member 31 and a second member 42 which is basically the second member 32 shown in FIG. 6C and provided with openings (openings 42C) to be the second member 42 in this example. Joining of both the members 31, 42 is conducted such that after the first member 31 and the second member 42 are superimposed and then combined together, wax material with a low melting point and flax are placed on the openings 42C to be heated and melted.

The procedures for making the thickness of the wax material between both the members as thin as possible and for having it retain elasticity to some extent after they are joined together are performed such that the first member 31 and the second member 42 are placed one on top of the other and then combined with each other on a heat-proof flat plate such as metal or the like; the wax material and flax are placed on the openings 42$c$; weights are placed thereupon so that the whole of joining regions are tightly attached to each other; and followed by heating, melting them in order to join both the members. Consequently, the wax material is melted and spreads across the contact surface between the first member 31 and the second member 42, and both the members are joined with each other. Since extra wax material is left as a solder pool at the openings 42*c* of the second member 42, the joining surface is covered with extremely thin wax material, so that elasticity can be imparted thereto though not the same extent of elasticity where mono-material is used.

In the case of that wax welding, since only a heating oven or the like is used for joining equipment, the expense of equipment is reduced in manufacturing the members, and as a result, parts can be obtained at low costs. As described so far, it can be easily understood that effectiveness similar to the above-mentioned example will also be obtained on operation when the conductive terminal board 44 in this example is used.

Figure 8A:
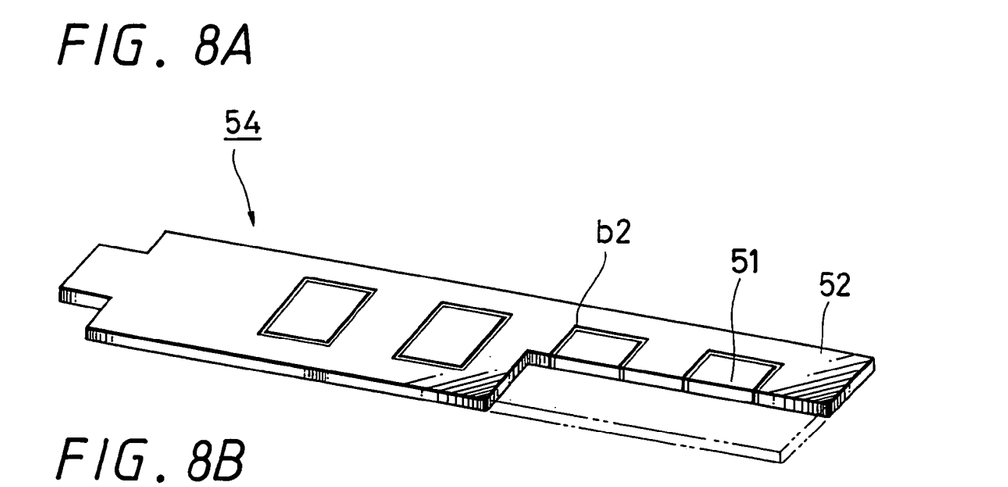
FIG. 8A is a perspective view, a part of which is cross-sectional, for explaining an example of a conductive terminal board without having a portion where the first member and second member are superimposed.
Figure 8B:
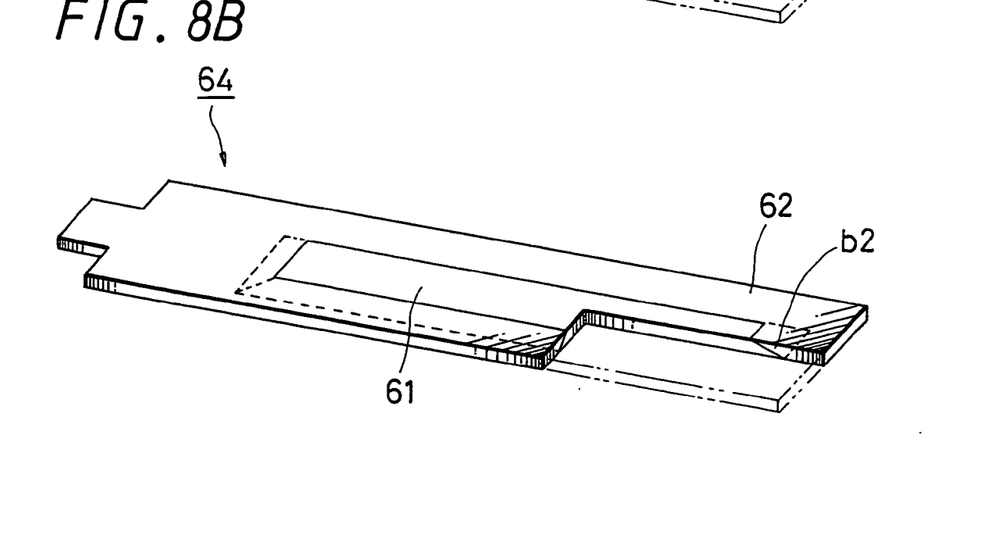
FIG. 8B is a perspective view, a part of which is cross-sectional, for explaining a conductive terminal board in which the first member is shaped like a single plate.

FIGS. 8A and 8B shows another example of the shapes of a first member and a second member that constitute a conductive terminal board used in the present invention and a joining method thereof, and show an example having a more simplified structure. FIG. 8A is an example of the structure in which a first member 51 is arrayed in an islands-like state, however a stepped difference portion is not provided between the first member 51 and second member 52, so that a superimposed portion is not provided when the first member 51 and second member 52 are combined with each other. Since those members can be simply manufactured by only punch-out pressing, the first member 51 is fit in openings of the second member 52, with a wax material having a low melting point and flax supplied into the gap between the boundaries of both the members to be heated and melted, and both the members are joined with each other to be a conductive terminal board 54. According to this example, the structure of the members is simplified; joining of both the members can be simply carried out by the use of a heat oven or the like; and as a result, the costs of the members and for manufacturing thereof become extremely low. In addition, it can be easily understood that effectiveness similar to the above-mentioned example will also be obtained on operation when the conductive terminal board 54 in this example is used.

Further, an example of FIG. 8B shows a shape in which after four blocks constituting the island portions of the first member 11 shown in FIG. 3 are enlarged to cover the bridge portion 11*a*, becoming one sheet of a mono-plate-like block with a stepped difference, the stepped difference at the periphery of the block is further changed into a slope-like state.

As a result, a first member 61 of a conductive terminal board 64 becomes an approximately oblong mono-plate to be shaped such that the joining surface with a second member 62 has the peripheral surface thereof provided with a slope instead of having the stepped difference so that the joining area of both the members becomes as wide as possible to be joined with each other. The member having such a sloped surface can be made the conductive terminal board 64 by the use of the wax joining method of supplying a wax material and flax into the gap between both the members, followed by heating and melting them to join the members with each other.

In the conductive terminal board 64, since the shapes of the members are simplified, the manufacture of the members is carried out such that after an opening and outer shape are processed by punch-out pressing, the slope of the periphery is easily processed by mold-pressing, so that the number of steps for the processing can be reduced. In addition, since only a heating oven or the like is required for joining equipment, the expense of equipment is reduced in manufacturing the members, and as a result, parts can be obtained at low-costs. As described so far, it can be easily understood that effectiveness similar to the above-mentioned example will also be obtained on operation when the conductive terminal board 64 in this example is used.

In the above description, the example when four battery cells 13 are housed in the battery pack has been explained; however, with reference to FIGS. 9A and 9B, another embodiment of the present invention will be explained in which a battery pack houses more battery cells 13 in order to increase capacity, so that the battery pack is used as long as possible.

Figure 9A:
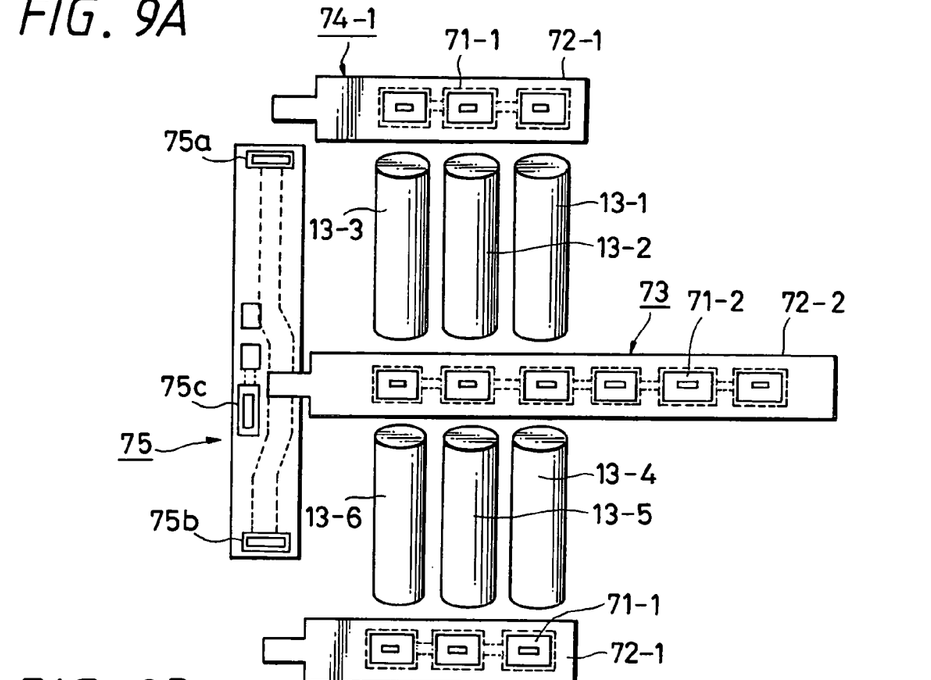
FIG. 9A is a diagram showing constituting parts.
Figure 9B:
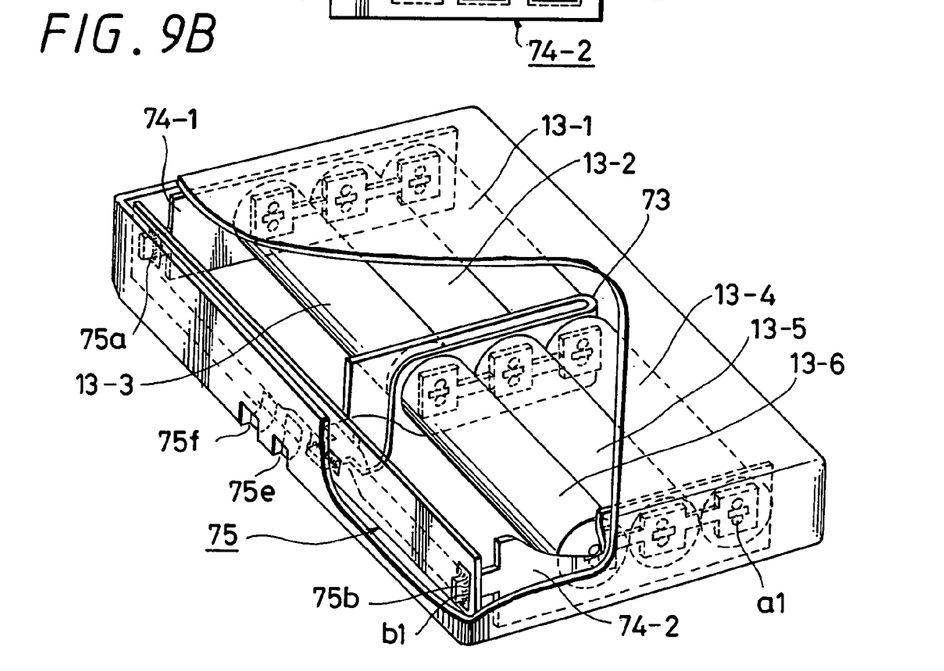
FIG. 9B is a schematic diagram showing a shape of a battery pack in the case where the number of battery pack is six.

FIGS. 9A and 9B show a battery pack in which the number of housed battery cells 13 is six and the battery cells 13 are constituted such that two groups of three battery packs connected in parallel to each other are arranged to be connected, so that electric capacity is made to be 1.5 times larger while applying the same amount of voltage when compared with the battery pack having four battery cells 13 as mentioned above. Constituting parts of this embodiment are, as shown in FIG. 9A, two sheets of conductive terminal boards 74-1, 74-2 each to be welded to negative electrodes 13*b* of three battery cells, one sheet of a conductive terminal board 73 welded to the positive electrodes 13*a* of six battery cells, one sheet of a control circuit substrate 75 electrically connected at three points to the above-mentioned conductive terminal boards 73, 74-1, 74-2, and six battery cells.

Here, the conductive terminal boards 73, 74-1, and 74-2 according to this embodiment are constructed such that the number of islands is changed based on the shapes of the first member 11 and second member 12 in the above-mentioned FIG. 3, with the number of the island portions of the conductive terminal board 73 made six and that of the island portions of the conductive terminal boards 74-1, 74-2 are each made three.

Additionally, the control circuit substrate 75 is a print substrate that incorporates a protection circuit not shown, for protecting the battery cells 13 when a charging voltage becomes excessive, provided with copper foil lands 75*a*, 75*b*, and 75*c* with oblong slits formed therein, into which projecting portions at one end of the conductive terminal boards 74-1, 74-2 can be inserted and soldered to make connections possible.

Such constituting parts are connected in the following way. First, the conductive terminal board 74-1 is connected to the negative electrode 13*b* side of the three battery cells 13-1, 13-2, 13-3 and the conductive terminal board 74-2 is connected to the negative electrode 13*b* side of the three battery cells 13-4, 13-5, 13-6 through electric resistance-welding. Then, the conductive terminal board 73 is connected to the positive electrode 13*a* side of these six battery cells 13-1 to 13-6.

Then, the projecting portions of the conductive terminal boards 73, 74-1, 74-2 are oriented in one direction for connecting to the control circuit substrate 75. At this time, as shown in FIG. 9B, since the positive-electrode conductive terminal board 73 is as thin as approximately 0.15 mm or so in thickness, it can be bent to be arranged.

Next, the projecting portion of the conductive terminal board 74-1 is inserted into the slit of the copper foil land 75*a* of the negative electrode of the control circuit substrate 75 and soldered, while the conductive terminal board 74-2 is similarly soldered to copper foil land 75*b* of the other negative electrode of the control circuit board 75. Lastly the projecting potion side of the conductive terminal board 75 is twisted by 90° and is inserted and soldered to the slit of copper foil land 75c of the positive electrode of the control circuit substrate 75 to be electrically connected. As a result, the battery cells 13, the control circuit substrate 75, the conductive terminal boards 73, 74 are connected to be housed in a case and sealed to make a battery pack. After that, the battery pack is attached to a battery charger not shown, is charged with a predetermined voltage and, after the charging is completed, is put to practical use as the battery pack with electric capacity of approximately 1.5 times larger than the above described embodiment.

In another embodiment of the present invention, as described above, effectiveness similar to the aforementioned embodiment of the present invention can be obtained, and at the same time, since the conductive terminal boards have elasticity, they are flexibly housed in even minimum space of the battery pack although the number of the battery cells become larger, contributing to the reduction of the number of steps to make manufacturing thereof easier. Namely, according to this embodiment, there is provided the battery pack with large capacity that is easy to manufacture, in which the parts are smoothly incorporated in the case; a large amount of electric current can be applicable; weldability is compatible with low resistance; loss of energy is small; and the efficiency of use is high.

In the above-mentioned embodiments, a mention has been made of the example in which nickel (Ni) is used for the first member of excellent weldability, and copper (Cu) is used for the second member of excellent conductivity; however, instead of those materials, any one of or material containing plural kinds among: iron (Fe), iron alloy, nickel alloy, stainless steel, zinc (Zn), zinc alloy, platinum (Pt), and platinum alloy may be used for the first member. Further, any one of or material containing plural kinds among: copper (Cu), copper alloy, silver (Ag), silver alloy, gold (Au), gold alloy, aluminum (Al), aluminum alloy, beryllium (Be), beryllium alloy, rhodium (Rh), rhodium alloy, tungsten (W), tungsten alloy, molybdenum (Mo), and molybdenum alloy may be used for the second member of excellent conductivity.

In addition, as for the joining of the first member with the second member, the series spot-welding method of the electric resistance welding and the wax welding method have been mainly explained in the above embodiment; however, in stead of those methods, an ultrasonic wave welding method, a direct spot-welding method of the electricity-resistance-welding, a thermo compression bonding method, a conductive adhesive agent or the like can be also adopted.

Here, the thermo compression bonding method is a method of joining two sheets of metal with each other by heating them up to a high temperature and applying high pressure from upper and lower in the direction vertical to the plane, wherein the surfaces of metal sheets approach each other in terms of an atomic level to be joined with each other.

As explained above, the present invention is not limited to the above-mentioned embodiments, and it is needless to say that various kinds of combinations can be applied with respect to: the number of loaded battery cells, layout, the connection of island portions and slits in the first member, a stepped difference at the joining surface between the first member and second member, a slope and the like, without departing from the gist of the present invention, and other various kinds of constitutions can also be adopted.

According to the present invention, since the conductive terminal board used in the battery pack has a structure in which the first member with excellent weldability is arrayed in a plurality-of-islands state in the second member with excellent conductivity and then joined to each other, the terminal board is manufactured to be thin in thickness as both the members are joined with each other. In addition, since the second member with excellent conductivity almost constitutes the whole of the conductive terminal boards, a low resistance property can be achieved, and further, since the connection to the battery cells is conducted by the use of the first member with excellent weldability, the terminal board having a low resistance property and excellent weldability can be obtained. Therefore, it is possible to secure a battery pack: having the conductive terminal board with excellent conductive and welding properties; energy loss of which is small, a large amount of the electric current being applicable; and having a wiring structure easy to be manufactured because the constitution thereof is simplified.

According to the present invention, since the first member and second member are joined with each other, the thickness of the conductive terminal board is made as thin as appropriately 0.15 mm. Further, since the battery cells can be electricity-resistance-welded with the first member with an excellent resistance-welding property when the battery cells are connected to the conductive terminal board, connections are secured and the connection reliability becomes improved. In addition, since the most part of the conductive terminal board except for the portions welded to the battery cells 13, is composed of copper of approximately 0.15 mm in thickness which is second member having excellent conductivity, low volume resistivity, and excellent thermal conductance, wiring resistance becomes smaller and heat dissipation becomes larger.

According to the present invention, when the conductive terminal board is a constituting part of the battery pack, the loss of energy can be improved and the temperature of the battery cells can be prevented from rising, so that a large amount of the electric current can be applicable. Further, since the conductive terminal board has elasticity, it can be flexibly housed even if the battery pack has minimum space therein.

According to the present invention, it is possible to realize the battery pack that can stably discharge a large amount of electric current even in a high temperature atmosphere that has an atmospheric temperature of approximately 30° C.

Further, since the loss of energy through the conductive terminal board is small at the time of charging and discharging with respect to the battery pack, the resources of the earth are never wastefully consumed.

Additionally, since the first member and second member can be formed by the use of simple manufacturing methods such as the etching method, mold pressing, and punch-out pressing, and joining of the first member with second member can be practiced by electric resistance welding, it becomes easy to manufacture the conductive terminal board.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A battery pack housing a plurality of battery cells, the battery pack comprising:
   a case having a conductive terminal board respectively connecting positive electrodes and negative electrodes of said plurality of battery cells to outside terminals, wherein said conductive terminal board has a structure in which a first member is joined with a second member such that said first member having excellent weldability is arrayed in a plurality-of-islands state in said second member having excellent conductivity, the islands of the first member being formed as a common structure such that adjacent islands are connected by a narrow portion that is narrower than the respective island portions, wherein said first member of said conductive terminal board includes a rectangular slit in at least one island portion of the first member and the positive electrodes and the negative electrodes of said battery cells are welded to said first member of said conductive terminal board through resistance welding, and wherein said second member having excellent conductivity has a structure in which a projecting portion for connecting a control circuit substrate is provided on one short side of a plate portion having an oblong card shape that is larger than said first member in outer shape thereof, said first member being joined with said plate portion of said second member, a combined thickness of said first member joined with said second member being approximately uniform.

2. A battery pack according to claim 1, wherein
said first member of said conductive terminal board is joined with the second member such that one surface of the first member shows an islands-like shape and the other surface thereof shows a shape that the island portions are connected to each other.

3. A battery pack according to claims 1 or 2, wherein
said first member of said conductive terminal board contains any one of or plural kinds among: nickel (Ni), nickel alloy, iron (Fe), iron alloy, stainless steel, zinc (Zn), zinc alloy, platinum (Pt), platinum alloy; and said second member contains any one of or plural kinds among: copper (Cu), copper alloy, aluminum (Al), aluminum alloy, silver (Ag), silver alloy, gold (Au), gold alloy, beryllium (Be), beryllium alloy, rhodium (Rh), rhodium alloy, tungsten (W), tungsten alloy, molybdenum (Mo) and molybdenum alloy.

4. A battery pack according to claims 1 or 2, wherein
said first member of said conductive terminal board is provided with slits, and the positive and negative electrodes of said battery cells are welded through a series-spot-electricity-welding such that said slits are straddled by electrodes thereof.

* * * * *